United States Patent
Akiyama et al.

(10) Patent No.: US 10,563,108 B2
(45) Date of Patent: Feb. 18, 2020

(54) LATENT HEAT STORAGE BODY, METHOD FOR PRODUCING LATENT HEAT STORAGE BODY AND HEAT EXCHANGE MATERIAL

(71) Applicant: NATIONAL UNIVERSITY CORPORATION HOKKAIDO UNIVERSITY, Sapporo-shi (JP)

(72) Inventors: Tomohiro Akiyama, Sapporo (JP); Takahiro Nomura, Sapporo (JP); Akihito Sagara, Sapporo (JP); Noriyuki Okinaka, Sapporo (JP); Chunyu Zhu, Sapporo (JP)

(73) Assignee: NATIONAL UNIVERSITY CORPORATION HOKKAIDO UNIVERSITY, Sapporo-shi (JP)

( * ) Notice: Subject to any disclaimer, the term of this patent is extended or adjusted under 35 U.S.C. 154(b) by 388 days.

(21) Appl. No.: 15/305,950

(22) PCT Filed: Apr. 23, 2015

(86) PCT No.: PCT/JP2015/002204
§ 371 (c)(1),
(2) Date: Oct. 21, 2016

(87) PCT Pub. No.: WO2015/162929
PCT Pub. Date: Oct. 29, 2015

(65) Prior Publication Data
US 2017/0044415 A1 Feb. 16, 2017

(30) Foreign Application Priority Data
Apr. 24, 2014 (JP) ................. 2014-090084

(51) Int. Cl.
*C09K 5/06* (2006.01)
*B01J 21/04* (2006.01)
*B01J 21/06* (2006.01)

(52) U.S. Cl.
CPC ............... *C09K 5/063* (2013.01); *B01J 21/04* (2013.01); *B01J 21/06* (2013.01)

(58) Field of Classification Search
CPC ................. C09K 5/063; B01J 21/06
See application file for complete search history.

(56) References Cited

U.S. PATENT DOCUMENTS 4,851,375 A * 7/1989 Newkirk ............... C04B 35/652
501/88
4,873,038 A * 10/1989 Rapp ....................... C04B 35/65
264/82

(Continued)

FOREIGN PATENT DOCUMENTS

| CN | 101798498 A | 8/2010 |
| CN | 101798498 B * | 8/2012 |

(Continued)

OTHER PUBLICATIONS

The partial Supplementary European Search Report dated Dec. 14, 2017 in Patent Application 15782845.0, 11 pages.

(Continued)

*Primary Examiner* — Mark Eashoo
*Assistant Examiner* — M. Reza Asdjodi
(74) *Attorney, Agent, or Firm* — Oblon, McClelland, Maier & Neustadt, L.L.P.

(57) ABSTRACT

In the latent heat storage body (100) according to the present invention, the surface of a core particle (10) composed of a latent heat storage material of a metal or an alloy is coated with an oxidized film of a compositional element of the core particle (10). Hence, the step of separately fabricating the core particle and the oxidized film (20) corresponding to a shell accommodating the core particle and accommodating the core particle inside the shell becomes unnecessary. Further since the core particle exhibits no expansion when transforming from a solid phase to a liquid phase, the (Continued)

930°C, 6h component of the melted latent heat storage material stays inside the space covered with the oxidized film and the oxidized film is never damaged. Further, the oxidized film (20) can be made chemically stable.

5 Claims, 17 Drawing Sheets

(56) References Cited

U.S. PATENT DOCUMENTS

| | | | | |
|---|---|---|---|---|
| 5,866,195 | A * | 2/1999 | Lemelson | C23C 16/545 |
| | | | | 29/599 |
| 6,951,985 | B1 * | 10/2005 | Lemelson | H01L 39/14 |
| | | | | 174/125.1 |
| 8,372,394 | B2 * | 2/2013 | Iwasaki | A61L 27/20 |
| | | | | 424/93.7 |
| 10,266,739 | B2 * | 4/2019 | Bronson | C09K 5/14 |
| 2010/0015102 | A1 * | 1/2010 | Iwasaki | A61L 27/20 |
| | | | | 424/93.7 |
| 2012/0100203 | A1 * | 4/2012 | Fang | H01M 4/131 |
| | | | | 424/443 |
| 2012/0148845 | A1 * | 6/2012 | Kouyama | C09K 5/063 |
| | | | | 428/402.24 |
| 2016/0194543 | A1 * | 7/2016 | Bronson | C09K 5/14 |
| | | | | 60/641.1 |
| 2017/0044415 | A1 * | 2/2017 | Akiyama | C09K 5/06 |
| 2018/0297850 | A1 * | 10/2018 | Tour | H01M 4/13 |

FOREIGN PATENT DOCUMENTS

| | | | | |
|---|---|---|---|---|
| EP | 0 193 292 | A2 | 9/1986 | |
| EP | 0 299 903 | A2 | 1/1989 | |
| JP | 54-26014 | B2 | 9/1979 | |
| JP | 054026014 | * | 9/1979 | |
| JP | 62-12678 | A | 1/1987 | |
| JP | 1-113486 | A | 5/1989 | |
| JP | 6-50681 | A | 2/1994 | |
| JP | 10-238979 | A | 9/1998 | |
| JP | 10238979 | A * | 9/1998 | ........... F28D 20/023 |
| JP | 11-23172 | A | 1/1999 | |
| JP | 2006128252 | A * | 5/2006 | |
| JP | 2012-111825 | A | 6/2012 | |
| JP | 2012-140600 | A | 7/2012 | |
| WO | WO 2013/061978 | A2 | 5/2013 | |

OTHER PUBLICATIONS

International Search Report dated Jul. 21, 2015 in PCT/JP2015/002204 (with English language translation).

International Preliminary Report on Patentability completed Aug. 10, 2016 in PCT/JP2015/002204 (with English language translation).

* cited by examiner (A)

SOLID PHASE (B)

LIQUID PHASE (A)

(B)

(C)

930°C、6h (A)

(B)

(A)

(B)

1130°C、6h (A)

(B)

(A)

(B)

LATENT HEAT STORAGE BODY, METHOD FOR PRODUCING LATENT HEAT STORAGE BODY AND HEAT EXCHANGE MATERIAL

TECHNICAL FIELD

The present invention relates to a heat storage technology, particularly to a heat storage body utilizable even in relatively high temperatures and excellent in heat storage density and heat conduction, and a producing method thereof.

BACKGROUND ART

As methods for storing heat, sensible heat storage utilizing the temperature change (for example, Patent Literature 1: Japanese Patent Laid-Open No. 6-50681) and latent heat storage utilizing the phase change of substances (for example, Patent Literature 2: Japanese Patent Laid-Open No. 10-238979) are known.

Among these, the sensible heat storage technology, since whereas being capable of store heat in high temperatures, the technology utilizes only sensible heat by temperature changes of substances, has a problem that the heat storage density is low. A technology proposed as a method of solving such a problem is a latent heat storage technology of utilizing latent heat of molten salts and the like and storing heat.

Various forms of heat storage bodies have been proposed as heat storage bodies to be used in the latent heat storage technology; and for example, Patent Literature 3 (Japanese Patent Laid-Open No. 11-23172) discloses inventions of a latent heat storage capsule characterized in that metal films of one layer, two layers or three layers are formed on the surface of a latent heat storage material, a producing method of a latent heat storage capsule characterized in that a latent heat storage material is coated with a metal film by an electro-plating method, and the like.

Further Patent Literature 4 (Japanese Patent Laid-Open No. 2012-140600) discloses an invention of a heat storage microcapsule in which a core containing at least one water-soluble latent heat storage material selected from salt hydrates and sugar alcohols, and a polymer obtained from a water-soluble monomer mixture of a water-soluble monofunctional monomer and a water-soluble polyfunctional monomer is coated with a shell formed of a hydrophobic resin.

Further Patent Literature 5 (Japanese Patent Laid-Open No. 2012-111825) discloses an invention of a heat storage body having: an internal heat storage body composed of a substance having heat storageability; and an outer shell composed of a ceramic including the internal heat storage body and having a relative density of 75% or higher.

CITATION LIST

Patent Literature

Patent Literature 1
    Japanese Patent Laid-Open No. 6-50681
Patent Literature 2
    Japanese Patent Laid-Open No. 10-238979
Patent Literature 3
    Japanese Patent Laid-Open No. 11-23172
Patent Literature 4
    Japanese Patent Laid-Open No. 2012-140600
Patent Literature 5
    Japanese Patent Laid-Open No. 2012-111825

SUMMARY OF INVENTION

Technical Problem

The latent heat storage capsule disclosed in Patent Literature 3, however, since both of the latent heat storage material to become its core and a coating film on the core surface are made of metal, depending on its use environment, has a risk of causing a chemical reaction at the interface between the core surface and the coating film in the course of heat storage cycles, then causing alloying and the like to thereby cause the strength degradation.

Further in the heat storage microcapsule disclosed in Patent Literature 4, the latent heat storage material is limited to a water-soluble material, and has a problem of not being suitable for use at high temperatures, for example, 150° C. or higher.

Further the heat storage body disclosed in Patent Literature 5, since being produced by separately fabricating an outer shell of the heat storage body and an internal heat storage body corresponding to an internal shape of the outer shell, disposing the internal heat storage body inside the outer shell having been divided into two, and joining surfaces of the outer shell, has such problems that the producing process becomes complicated and moreover, the size of the heat storage body unavoidably becomes large.

The present invention has been achieved in consideration of such problematic points of conventional latent heat storage methods, and has an object to provide a latent heat storage body stable even in the course of heat storage cycles, utilizable even in relatively high temperatures, for example, 150° C. or higher, and excellent in the heat storage density and the heat conduction.

Solution to Problem

In order to solve the above-mentioned problems, the latent heat storage body according to the present invention is characterized in that the surface of a core particle composed of a latent heat storage material is coated with an oxidized film of a compositional element of the core particle, and the core particle is composed of the latent heat storage material of a metal or an alloy.

In one aspect, the alloy making the core particle is an alloy (A-B alloy) of at least one alloy component A selected from the following group A with at least one alloy component B selected from the following group B; and the free energy) ($\Delta G_A^\circ$) of the oxide formation of the alloy component A and the free energy)($\Delta G_B^\circ$) of the oxide formation of the alloy component B satisfy a relationship of $\Delta G_A^\circ \geq \Delta G_B^\circ$.

Group A: Ca, Si, Bi, Mg, Sb, In, Sn, Al, Ti, Cr, Mn, Fe, Co, Ni, Cu, Zn, Pd, Ag, Au and Pb; and
Group B: Al, Cr, Mn, Si, Mg, Co and Ni.

Preferably, the metal or the alloy making the core particle is Al or an Al—Si alloy; and the Al—Si alloy is controllable to have a low volume expansion coefficient at melting by adjusting the content ratio of Si, which has a negative volume expansion coefficient at melting.

Further, preferably, the oxidized film is $\alpha$-$Al_2O_3$.

Further, preferably, the oxidized film has on its surface a metal film to strengthen the mechanical strength.

Further, preferably, when the latent heat storage material is in a solid phase state, the latent heat storage body has a void as a buffer between the core particle and the oxidized film.

The method for producing a latent heat storage body according to the present invention comprises a first step of subjecting the surface of a core particle composed of a latent heat storage material of a metal or an alloy to a chemical conversion coating treatment to thereby form a primary film, and a second step of subjecting the primary film to a heat treatment to thereby form an oxidized film as a secondary film on the surface of the core particle.

The chemical conversion coating treatment in the first step is, for example, one of a sol gel process, an anodic oxidation treatment, an alkali-chromate process, a boehmite process, a chromate process, a phosphoric acid-chromate process, a zinc phosphate process and a non-chromate conversion coating treatment.

Preferably, the heat treatment in the second step is carried out at a temperature equal to or higher than the melting point of the latent heat storage material.

The latent heat storage material comprises, for example, Al or an Al—Si alloy, and the chemical conversion coating treatment in the first step is carried out by a boehmite process.

In one aspect, the latent heat storage material comprises Al or an Al—Si alloy, and in the chemical conversion coating treatment in the first step, the primary film is formed according to the following reaction equation.

$$2Al + 4H_2O \rightarrow Al_2O_3 \cdot H_2O + 3H_2 \uparrow$$

Further in one aspect, the latent heat storage material comprises Al or an Al—Si alloy, and in the heat treatment in the second step, the chemical conversion film is made to be $Al_2O_3$ according to at least one reaction equation of the following two equations.

$$Al_2O_3 \cdot H_2O \rightarrow Al_2O_3 + H_2O \uparrow$$

$$2Al + 1.5O_2 \rightarrow Al_2O_3$$

Preferably, the latent heat storage material comprises Al or an Al—Si alloy; and the heat treatment in the second step is carried out at a temperature at which an $\alpha\text{-}Al_2O_3$ film is formed, to thereby make the chemical conversion film and an oxidized film newly formed by oxidation during the heat treatment $\alpha\text{-}Al_2O_3$.

Further, preferably, the latent heat storage material comprises Al or an Al—Si alloy; and the Al concentration of the Al—Si alloy provided for the chemical conversion coating treatment in the first step is set to a higher concentration than the Al concentration of the Al—Si alloy after the completion of the second step.

Further, preferably, the latent heat storage material comprises Al or an Al—Si alloy; and the first step comprises, prior to the chemical conversion coating treatment, a sub-step of making the Al concentration of the surface of the core particle to a concentration higher than the Al concentration of the bulk.

Further, preferably, the producing method comprises a third step of subjecting the surface of the oxidized film to a chemical treatment or a physical treatment to thereby form a metal film to strengthen the mechanical strength.

In the heat exchange material according to the present invention, the above-mentioned latent heat storage body is dispersed and carried in a heat-resistive base material. Further in a catalytically functional latent heat storage body according to the present invention, a catalytic material is carried or deposited on the surface of the above-mentioned latent heat storage body.

Advantageous Effects of Invention

In the latent heat storage body according to the present invention, the surface of a core particle composed of a latent heat storage material is coated with an oxidized film of a compositional element of the core particle. The core particle is composed of the latent heat storage material of a metal or an alloy.

Hence, in addition to that a step becomes unnecessary in which a core particle and an oxidized film corresponding to a shell accommodating the core particle are separately fabricated, and the core particle is accommodated inside the shell, the capsulation progresses in a liquid phase state exhibiting a largest volume. Hence, the component of the melted latent heat storage material stays inside the space covered with the oxidized film, and the oxidized film is never damaged.

Further since the oxidized film can be made chemically stable, it becomes possible to provide a latent heat storage body stable even in the course of heat storage cycles, utilizable even in relatively high temperatures, and excellent in the heat storage density and the heat conduction.

BRIEF DESCRIPTION OF DRAWINGS

FIG. 13 is examples of latent heat storage bodies having been subjected to the above-mentioned capsulation using core particles composed of Al—Si alloys having different Si contents, in which FIG. 13(A) is SEM images of latent heat storage bodies obtained by capsulating core particles composed of an Al-12 wt % Si alloy; FIG. 13(B), by capsulating core particles composed of an Al-17 wt % Si alloy; and FIG. 13(C), by capsulating core particles composed of an Al-25 wt % Si alloy.

DESCRIPTION OF EMBODIMENTS

Hereinafter, the latent heat storage body and the producing method thereof according to the present invention will be described by reference to the drawings.

[Basic Structure]

Figure 1:
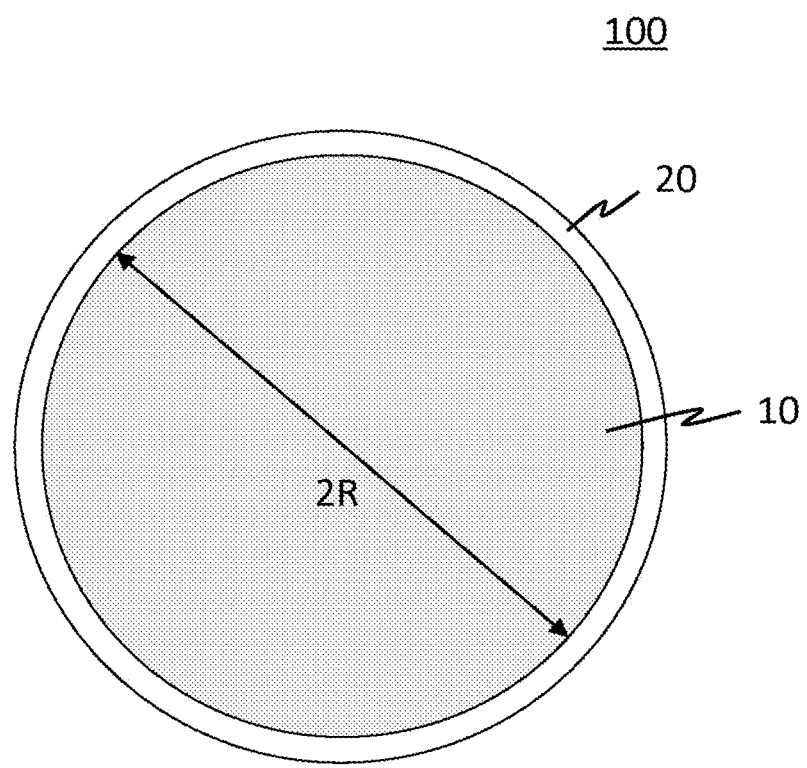
FIG. 1 is a cross-sectional view to conceptually interpret a structure of the latent heat storage body according to the present invention.

FIG. 1 is a cross-sectional view to conceptually interpret a structure of a latent heat storage body 100 according to the present invention. In the figure, reference numeral 10 indicates a core particle composed of a latent heat storage material and having a radius of R; and the surface of the core particle 10 is coated with an oxidized film 20 of at least one alloy component (compositional element) composing the core particle 10.

In the present invention, for the core particle 10, a latent heat storage material of a metal or an alloy is selected. Here, in the case where the core particle 10 is an alloy, the alloy is an alloy (A-B alloy) of at least one alloy component A selected from the following group A with at least one alloy component B selected from the following group B; and the standard free energy of formation)($\Delta G_A^0$) of an oxide of the alloy component A and the standard free energy of formation)($\Delta G_B^0$) of an oxide of the alloy component B satisfies a relationship of $\Delta G_A^0 \geq \Delta G_B^0$.

Here, the alloy component A functions mainly as a heat storage material. Further the alloy component B functions mainly to form an oxide phase.

Group A: Ca, Si, Bi, Mg, Sb, In, Sn, Al, Ti, Cr, Mn, Fe, Co, Ni, Cu, Zn, Pd, Ag, Au and Pb Group B: Al, Cr, Mn, Si, Mg, Co and Ni In the case of selecting alloy components A and B whose standard free energies have a relationship of $\Delta G_A^0 < \Delta G_B^0$, in the course in which an oxide film containing the alloy component B is formed on the surface of a core particle composed of this alloy, not only the oxide reacts with the alloy component A and the film is broken, but also a desired composition thereof cannot be provided.

If alloy components A and B whose standard free energies have a relationship of $\Delta G_A^0 > \Delta G_B^0$ are selected, however, an oxide film containing the alloy component B hardly thermodynamically reacts with the alloy component A and the oxidized film 20 can function as a capsule of the core particle 10.

Further in the case of selecting alloy components A and B whose standard free energies have a relationship of $\Delta G_A^0 = \Delta G_B^0$, since the melted alloy component A (or melted alloy component B) reacts with oxygen in the air and forms an oxide phase A (or oxide phase B), part of the heat storage material is consumed, but the capsule is never broken. Further when the oxide phase comes to have a thickness in some degree, since the diffusion rate at which oxygen ions or alloy ions diffuse in the oxide phase becomes remarkably slow, the consumption of the heat storage material becomes remarkably small.

The core particle 10, in the case of absorbing heat from the circumference, phase-transforms from a solid phase to a liquid phase, and stores the absorbed heat as latent heat; and in contrast with this, in the case of releasing the latent heat to the circumference, the core particle 10 phase-transforms from the liquid phase to the solid phase. Generally, the volume $V_S$ in a solid phase time and the volume $V_L$ in a liquid phase time have a relationship of $V_S \leq V_L$; if an oxidized film is formed from a solid phase state alone, due to the expansion of the core particle 10 when the core particle 10 phase-transforms from the solid phase to the liquid phase, the oxidized film 20 with which the surface of the core particle 10 is coated is damaged and the component of the melted latent heat storage material results in leaking out.

By contrast, in the present invention, in the first step, a precursor of a capsule (oxidized film) is formed by subjecting the surface of a core particle to a chemical conversion coating treatment at a temperature equal to or lower than the melting point of a latent heat storage material. Hence, even if the oxidized film formation in the second step is carried out at a temperature equal to or higher than the melting point of the core particle, the spherical capsule shape is held; consequently, the latent heat storage material component never leaks out to the outside.

Further in the second step, by capsulating (oxidized film treatment) the latent heat storage material in a liquid state in which the volume of the latent heat storage material has expanded, a spatial buffer to absorb an amount of the volume expansion in the phase transformation from a solid phase to a liquid phase can also be gained. Hence, the component of the melted latent heat storage material stays inside the space covered with the oxidized film 20, and the oxidized film 20 is never damaged. Since the precursor obtained by the chemical conversion coating treatment forms a remarkably compact oxide precursor phase, an oxide phase obtained by the heat treatment/oxidation treatment is remarkably compact and becomes very advantageous as a capsule to enclose the latent heat storage material.

Figure 2:
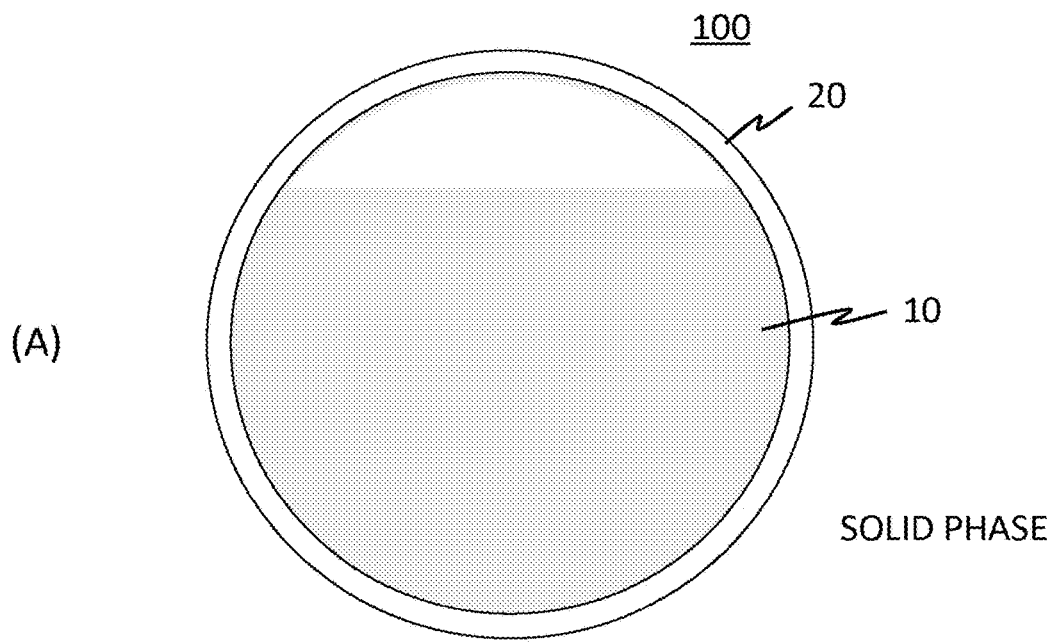
FIG. 2 is a cross-sectional schematic view (A) of a latent heat storage body in the case where a core particle is in a solid phase state, and a cross-sectional schematic view (B) of the latent heat storage body in the case where the core particle is in a liquid phase state.
Figure 2:
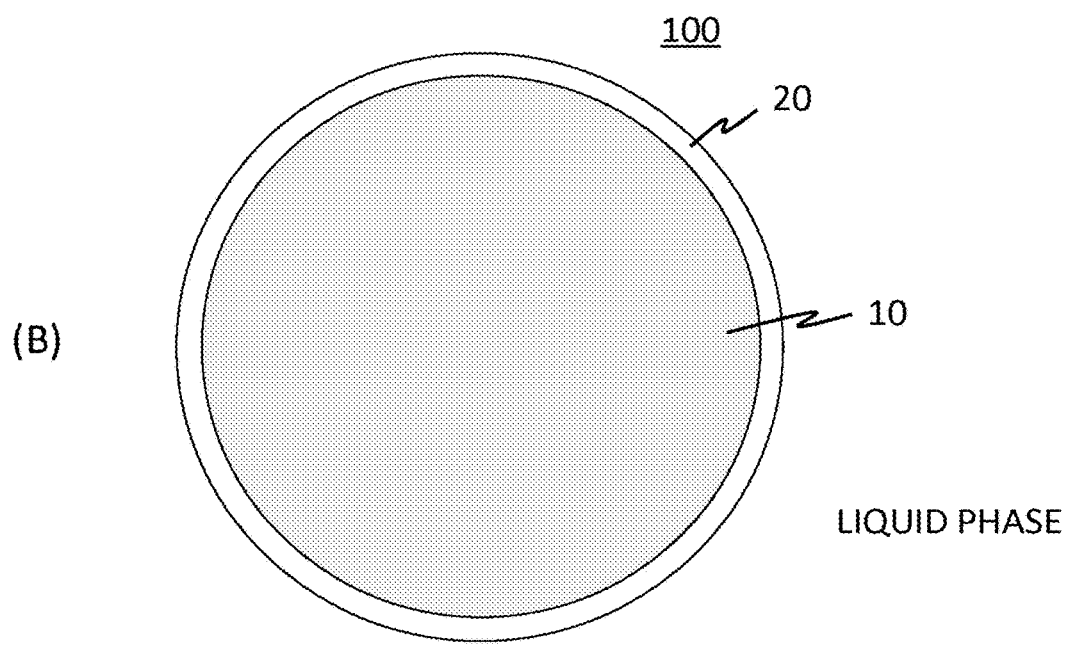

FIG. 2 is a cross-sectional schematic view (A) of a latent heat storage body 100 in the case where a core particle 10 is in a solid phase state, and a cross-sectional schematic view (B) of the latent heat storage body 100 in the case where the core particle 10 is in a liquid phase state.

Whereas in the case where the core particle 10 is in a solid phase state, the surface of the core particle 10 is coated with an oxidized film 20, inside which a spatial buffer (void portion) is present, in the case where the core particle 10 is in a liquid phase state, since the latent heat storage material has a relationship of $V_S \leq V_L$ in the volume $V_S$ in a solid phase time and the volume $V_L$ in a liquid phase time, the volume expansion of the core particle 10 in the phase transformation time from the solid phase to the liquid phase fills the spatial buffer present in the solid phase time. Therefore, the component of the melted latent heat storage material stays inside the space covered with the oxidized film 20.

Here, the larger the difference between the volume $V_S$ in a solid phase time and the volume $V_L$ in a liquid phase time, the larger the void portion inside the space covered with the oxidized film 20 to be generated when the latent heat storage material is in a solid phase state. Then, due to the presence of such a void portion, on the inner surface of the oxidized film 20, the strain and the like produced between a part of the oxidized film 20 contacting the core particle and a part thereof not contacting the core particle become high, and the oxidized film 20 may come to be damaged in repeated use.

Then, as the latent heat storage material, a material controlled to have a low volume expansion coefficient in the phase transformation from a solid phase to a liquid phase is preferably selected.

In the present invention, it is preferable to select, as such a latent heat storage material, select a metal having a negative volume expansion coefficient at melting, or an alloy composed of a metal having a positive volume expansion coefficient at melting and a metal having a negative volume expansion coefficient at melting. Examples of the metal having a negative volume expansion coefficient at melting include Si and Bi. Further examples of the metal having a positive volume expansion coefficient at melting include In, Sn, Sb, Mg, Al, Ti, Cr, Mn, Fe, Co, Ni, Cu, Zn, Pd, Ag, Au and Pb. If an alloy composition of a metal having a positive volume expansion coefficient at melting and a metal having a negative volume expansion coefficient at melting is reasonably set, the volume expansion coefficient at melting is allowed to be controlled at 0%.

For example, a latent heat storage material is made of an alloy containing at least one selected from the group consisting of Al, Cr and Ni, which are metals having a positive volume expansion coefficient at melting, and Si, which is a metal having a negative volume expansion coefficient at melting.

Among such alloys, examples of preferable materials include alloys of Al, which is a metal having a positive volume expansion coefficient at melting, with Si, which is a metal having a negative volume expansion coefficient at melting. The content ratio of Si in this case is preferably 25 wt % or lower, and more preferably 12 wt % or higher and 25 wt % or lower. Particularly the case where the content ratio of Si in an Al—Si alloy is 25 wt % enables the volume expansion coefficient at melting of the Al—Si alloy to be controlled at 0%.

Such an oxidized film 20 can be made to be an oxide of a metal being a component of a latent heat storage material to become a core particle 10, or can also be made to be an oxide containing a component of a chemical or the like to be used in a chemical conversion coating treatment described later. For example, in the case where a latent heat storage material to become a core particle 10 is an Al—Si alloy, an oxide of Al being its component is made to be the oxidized film 20. In this case, the $\alpha$-$Al_2O_3$ is chemically stable and is suitable as the oxidized film 20.

[Producing Method]

In the present invention, the above-mentioned latent heat storage body is produced by subjecting the surface of a core particle 10 to a chemical conversion coating treatment to thereby previously form a primary film, and subjecting the primary film to a heat treatment to thereby form an oxidized film as a secondary film on the surface of the core particle 10.

Figure 3:
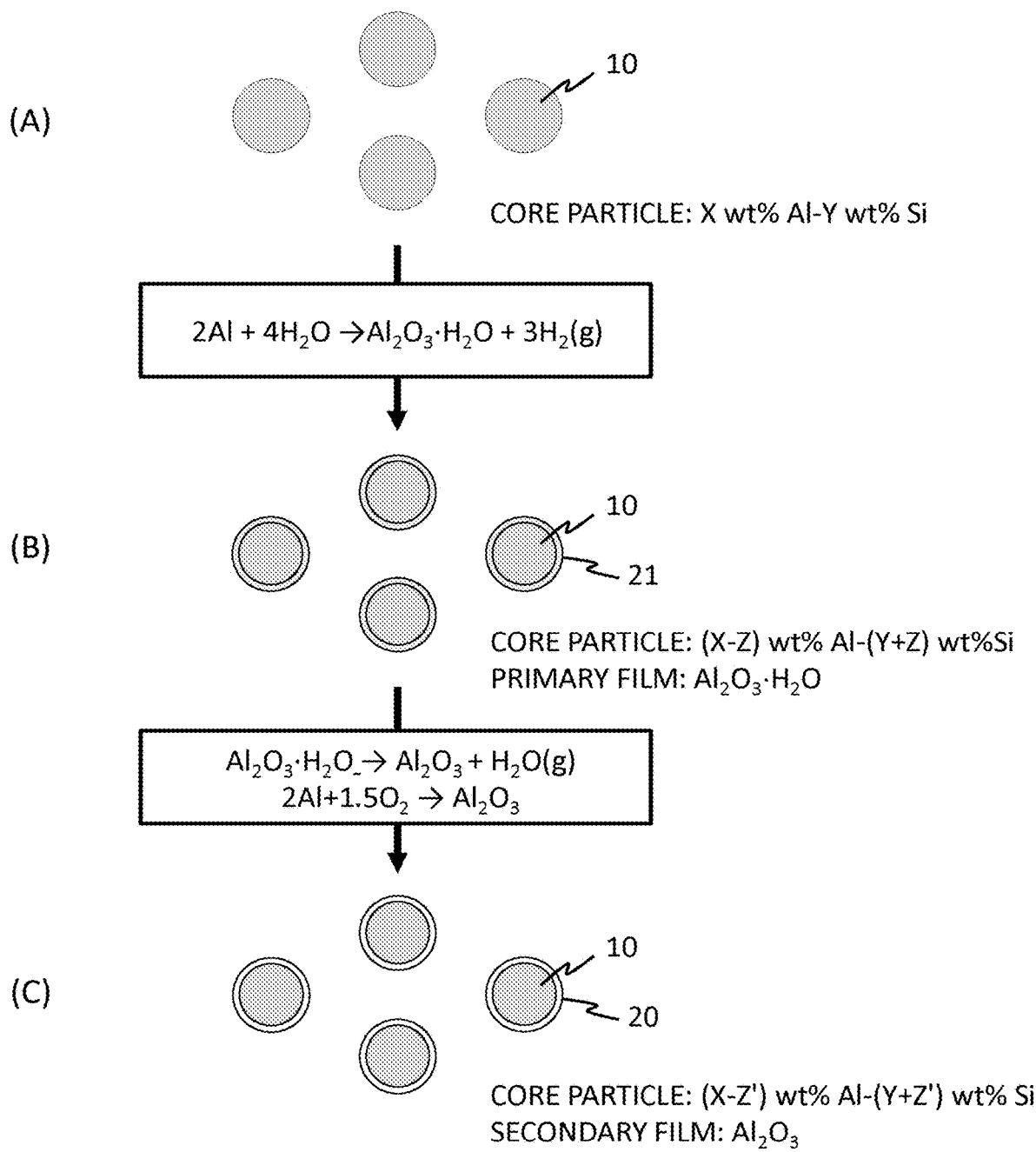
FIG. 3 is a diagram to interpret a process example of a producing method of the latent heat storage body according to the present invention.

FIG. 3 is a diagram to interpret a process example of a producing method of the latent heat storage body according to the present invention. In this example, the latent heat storage material making a core particle 10 is made of an alloy of X wt % of Al and Y wt % of Si.

First, core particles 10 composed of the X wt % Al—Y wt % Si alloy are prepared (A). The core particles 10 are subjected to a chemical conversion coating treatment to thereby form a primary film on their surface (B).

In the chemical conversion coating treatment, as in the following reaction equation, the Al component in the surface of the core particle 10 reacts with moisture to thereby form a hydrate of aluminum oxide ($Al_2O_3 \cdot H_2O$), which becomes the primary film 21. Here, the surplus hydrogen becomes a gas.

$$2Al + 4H_2O \rightarrow Al_2O_3 \cdot H_2O + 3H_2 \uparrow$$

The composition in the surface vicinity area of the core particle 10 after the formation of the primary film 21 becomes such a state ([X−Z] wt % Al—[Y+Z] wt % Si) that Al lacks slightly more by an amount of oxidized Al by the chemical conversion coating treatment than in the initial composition (X wt % Al—Y wt % Si).

A method of the chemical conversion coating treatment may suitably be selected according to the latent heat storage material making the core particle 10, and examples thereof include a sol gel process, an alkali-chromate process, a boehmite process, a chromate process, a phosphoric acid-chromate process, a zinc phosphate process and a non-chromate conversion coating treatment, but are not limited thereto.

In the case where the latent heat storage material is composed of an Al—Si alloy, a boehmite process, which is one of means of chemically forming an oxidized film on the aluminum surface, that is, a process of forming a film on the aluminum surface in a high-temperature distilled water or in a weak alkali water solution, is effective. The boehmite process is known to form an $Al_2O_3 \cdot H_2O$ film almost uniformly on an alloy surface containing aluminum, and is a process best for the purpose of providing a compact oxidized film. Further the process in this time is known to be generally carried out at a temperature lower than the melting points of elements constituting the corresponding latent heat storage material.

Following the first step, the primary film 21 is subjected to a heat treatment to thereby form an oxidized film as a secondary film 20 on the surface of the core particle 10 (C).

In the heat treatment, as in the following reaction equation, moisture is dissociated from the hydrate of aluminum oxide ($Al_2O_3 \cdot H_2O$) being the primary film 21 to thereby make a crystalline aluminum oxide ($Al_2O_3$), and simultaneously, also the Al component in the surface of the core particle 10 reacts with oxygen to thereby make a crystalline aluminum oxide ($Al_2O_3$). Thereby, an oxidized film 20 which detains the component of the melted latent heat storage material inside the oxidized film 20, of course not only in the case where the core particle 10 is in a solid phase state, but also in the case of being in a liquid phase state is obtained.

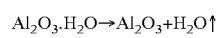
$$Al_2O_3 \cdot H_2O \rightarrow Al_2O_3 + H_2O \uparrow$$

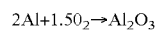
$$2Al + 1.5O_2 \rightarrow Al_2O_3$$

Also in this heat treatment, as in the above-mentioned chemical conversion coating treatment, the composition in the surface vicinity area of the core particle 10 after the formation of the secondary film 20 becomes such a state ([X−Z'] wt % Al—[Y+Z'] wt % Si) that Al lacks more by an amount of oxidized Al than in the composition ([X−Z] wt % Al—[Y+Z] wt % Si) after the formation of the primary film 21.

As described above, the Al composition in the surface vicinity area of the core particle 10 becomes such a state that Al lacks more by an amount of oxidized Al by the chemical conversion coating treatment as the first step and the heat treatment as the second step than in the initial composition (X wt % Al—Y wt % Si). Therefore, in the case where the composition in the surface vicinity area of the core particle 10 of the latent heat storage material finally obtained is intended to be made equal to the composition (X wt % Al—Y wt % Si) of the bulk, it is preferable that the surface of the core particle 10 be previously made to take an Al-rich state by an amount of Al lacking due to the above oxidation, by a method of previously vapor-depositing Al thinly on the surface of the core particle 10, or otherwise.

Alternatively, it is desirable that the composition of the alloy be previously adjusted with respect to the composition (X wt % Al—Y wt % Si) of the latent heat storage material intended to be finally provided. For example, on condition that a compositional variation of Z' wt % occurs with regard to the initial composition until a final product is obtained, it is preferable to use an alloy having an initial composition of, for example, ([X+Z] wt % Al—[Y−Z] wt % Si).

Further the above-mentioned heat treatment in the second step is preferably carried out at a temperature equal to or higher than the melting point of the latent heat storage material. Generally, the volume $V_S$ in a solid phase time and the volume $V_L$ in a liquid phase time have a relationship of $V_S \leq V_L$. That is, the volume $V_S$ when the core particle 10 is in a solid phase state never exceeds the volume $V_L$ in a liquid phase time. Therefore, on condition that the temperature of the second step of subjecting the primary film formed on the surface of the core particle 10 to the heat treatment to thereby make the oxidized film 20 is made to be a temperature equal to or higher than the melting point of the latent heat storage material, the internal volume of the shell of the oxidized film 20 formed by the heat treatment becomes a maximum volume the core particle 10 can take, and there is no risk of failure of the core particle 10 caused by the expansion thereof even in repeated use.

Particularly in the case where an Al—Si alloy is selected as the latent heat storage material, it is preferable that the heat treatment of the second step be carried out at a temperature of 880° C. or higher. Further it is preferable that the upper limit of the heat treatment temperature be made to be 1230° C. The melting point of an Al—Si alloy is, though depending on the compositional ratio of Al and Si, about 600° C.; for example, the melting point of an Al—Si alloy having a Si content ratio of 25 wt % is 580° C. Therefore, only on condition that the internal volume of the shell of the oxidized film 20 formed by the heat treatment in the second step is made to be a maximum volume the core particle 10 can take, it suffices if an aluminum oxidized film as the secondary film 20 is formed on the surface of the core particle 10 by the heat treatment, for example, at a temperature of 700° C.

The aluminum oxidized film formed by the heat treatment at a relatively low temperature of about 800° C. or lower, however, takes a crystal form of $\gamma\text{-}Al_2O_3$; and a secondary film 20 having a crystal form of $\alpha\text{-}Al_2O_3$, which is considered to be chemically stable, is obtained at a relatively high temperature of about 880° C. or higher. Hence, in the case where an Al—Si alloy is selected as the latent heat storage material, in order to obtain a secondary film of $\alpha\text{-}Al_2O_3$, which is chemically stable, the heat treatment of the second step is carried out preferably at a temperature of 880° C. or higher. Thereby, the chemical conversion film and an oxidized film newly formed by oxidation during the heat treatment can be made to be $\alpha\text{-}Al_2O_3$.

A material is prepared by making the latent heat storage material according to the present invention to be contained in a heat-resistive base material or carried in a porous material, and then is conceivably used in a form of a bulky heat storage material in place of existing heat storage bricks, heat storage ceramic balls and porous ceramic filters.

Further the strengthening of the mechanical strength of the capsule is possible by providing the above-mentioned latent heat storage material with a step of subjecting the latent heat storage material to chemical means such as a sol gel process, CVD, electroplating and electroless plating, and a physical treatment such as PVD, and carrying out over-coating with a metal film or an oxide film.

Further a heat storage body (catalytically functional latent heat storage body) having both a catalytic function and a heat storage function is enabled to be fabricated by making various types of catalysts to be carried or deposited on the capsule surface of the above-mentioned latent heat storage body.

EXAMPLES

Figure 4:
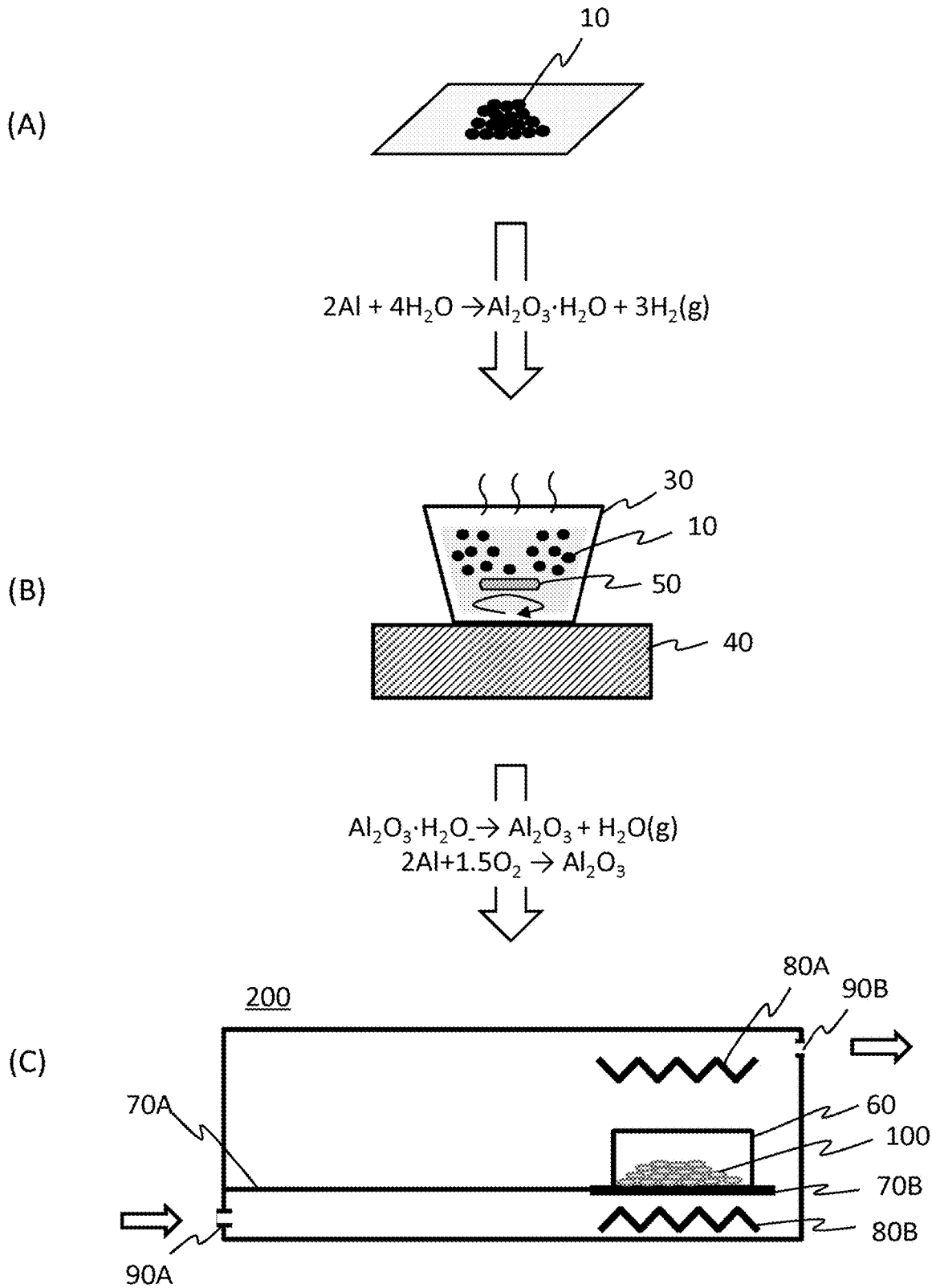
FIG. 4 is a diagram to interpret a process of a producing method of a latent heat storage body, in Examples.

FIG. 4 is a diagram to interpret a process of a producing method of a latent heat storage body in the present Examples; FIGS. 4(A) to 4(C) correspond to FIGS. 3(A) to 3(C), respectively. In the present Examples, latent heat storage materials making core particles 10 are made of Al—Si alloys having a Si content ratio of 12 to 25 wt %; and first, the core particles 10 composed of the Al-12 to 25 wt % Si alloys are provided (A). The particle size of the core particles 10 is suitably set according to a particle size to be "capsulated" as described later, but when the particle size is larger than about 10 μm, the "capsulation" is possible. Here, an average particle diameter of about 36 μm is used.

The core particles 10 were packed in a beaker 30 containing distilled water; and the distilled water is heated to 100° C. on a hot plate 40 to thereby subject the surface of the core particles 10 to a boehmite treatment for 3 hours under stirring by a stirring rod 50. This treatment forms a primary film of aluminum oxide to become a precursor of $\alpha\text{-}Al_2O_3$ on the surface of the core particles 10 (B).

Then, the core particles 10 having the primary film of aluminum oxide formed thereon are packed in a crucible 60; and the crucible 60 is mounted on the upper portion of a thermocouple 70B installed on a front end of an insert bar 70A, and set in a heat treatment oven 200 equipped with heaters 80A, 80B (C).

An oxygen gas is supplied from a gas introduction port 90A of the heat treatment oven; and an exhaust gas is introduced outside from a gas exhaust port 90B. In the oxygen atmosphere, the temperature of the core particles 10 having the primary film of aluminum oxide formed thereon is gradually raised; and a heat treatment (oxidation treatment) is carried out for 6 hours from a time point when the temperature of specimens reaches a predetermined temperature (for example, 930° C.) of 880 to 1230° C. to thereby form an $\alpha\text{-}Al_2O_3$ film as a secondary film 20 on the surface of the core particles 10.

Figure 5:
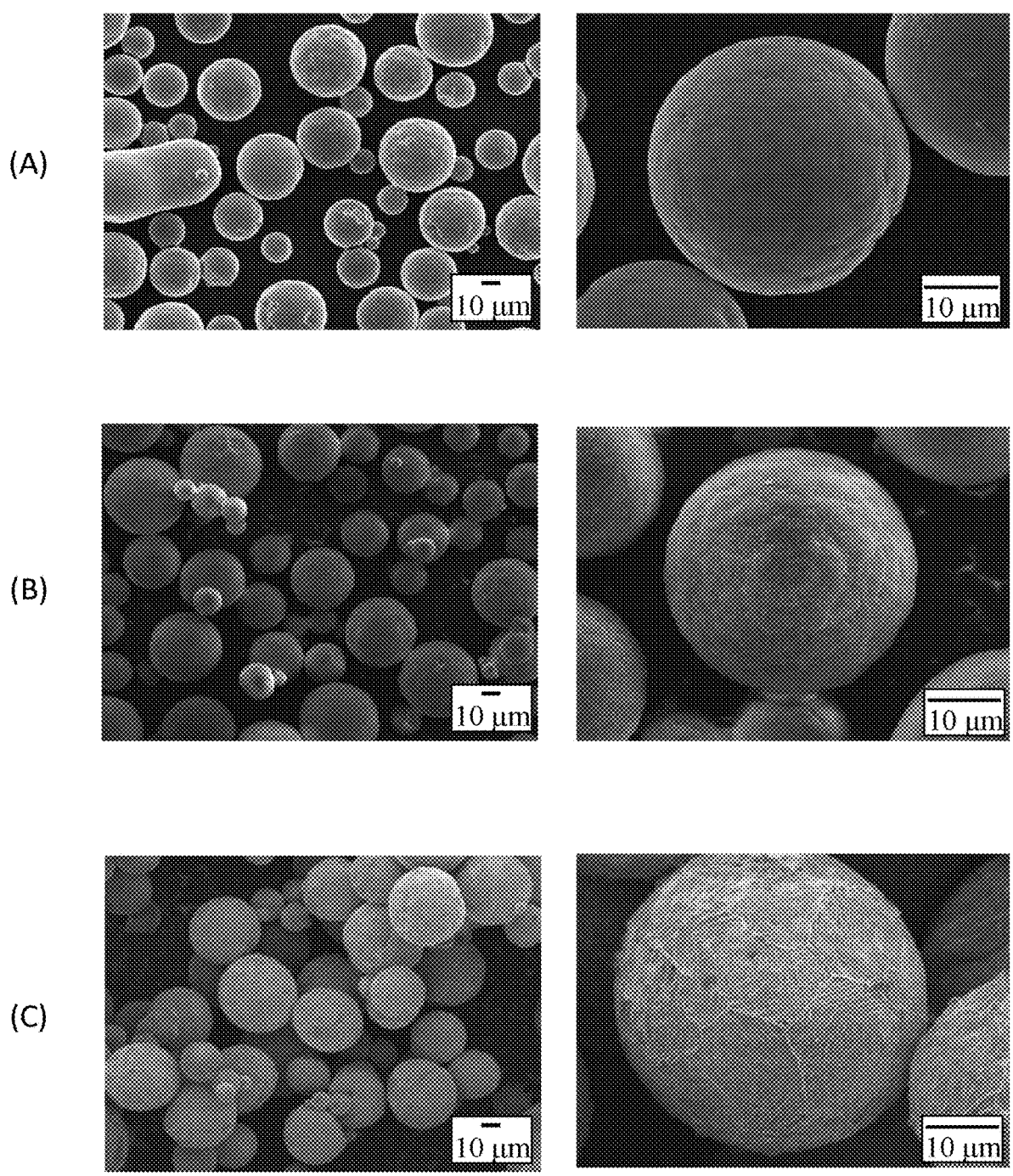
FIG. 5 is observation results by SEM of the shape and the surface state of core particles and latent heat storage bodies in Examples, and SEM images (A) of core particles composed of an Al-25 wt % Si alloy, SEM images (B) of core particles in the state that a primary film of aluminum oxide is formed on the surface of the core particles, and SEM images (C) of latent heat storage bodies in which an $\alpha\text{-}Al_2O_3$ film as a secondary film is formed on the surface of core particles.

FIG. 5 is examples of observation by SEM of shapes and surface states of the core particles 10 and latent heat storage bodies 100 in the above each step; the examples are specimens obtained by subjecting the core particles 10 composed of an Al-25 wt % Si alloy to the oxidation treatment at 930° C. SEM images of FIGS. 5(A) to 5(C) are, respectively, core particles 10 (A) composed of an Al-25 wt % Si alloy, specimens (B) in the state that a primary film of aluminum oxide to become a precursor of $\alpha$-$Al_2O_3$ is formed on the surface of the core particles 10, and specimens (C) of latent heat storage bodies 100 in which an $\alpha$-$Al_2O_3$ film as a secondary film 20 is formed on the surface of the core particles 10.

As clear from SEM images of FIG. 5(A), the core particles 10 have relatively smooth surfaces and have shapes of a nearly true sphere. Further their sizes were checked and the average particle diameter was about 36 µm and no particles exceeding 60 µm were observed.

On inspection of SEM images of FIG. 5(B), it can be found that the surface after the chemical conversion coating treatment (boehmite treatment) of the first step carried irregularities, and the primary film was formed on the surface of the core particles 10. On EDS analysis of the surface, a peak of aluminum and a peak of oxygen can be found. That is, the boehmite treatment advanced an oxidation reaction of aluminum and formed a primary film of aluminum oxide, on the surface of the core particles 10 composed of an Al-25 wt % Si alloy. However, no remarkable change in the particle size after the boehmite treatment can be found.

By contrast, on inspection of FIG. 5(C), it is clear that the particle size after the above-mentioned heat treatment (oxidation treatment) definitely became large as compared with before the treatment. In addition thereto, on the surface after the oxidation treatment, "boundaries" as if the entire surface were partitioned into some regions can be found. On EDX analysis of the surface, a peak of aluminum and a peak of oxygen are found and it is clear that the oxidation reaction of aluminum more advanced and a secondary film of aluminum oxide was formed.

Here, as described above, the melting point of an Al—Si alloy having a Si content ratio of 25 wt % was 580° C.; for any of Al-12 to 25 wt % Si alloys which was confined as a core particle inside an oxidized film in the present Examples, the oxidation treatment was carried out at a temperature in the range of 880 to 1230° C., which exceeded the melting point of the alloy, but even in any case where the oxidation treatment was carried out under any temperature condition in this range, from SEM images of the latent heat storage bodies after the oxidation treatment, no indication of leaking out of the Al—Si alloy making the core particle in the oxidation treatment step can be found. That is, even if the heat treatment in the second step is carried out at a temperature equal to or higher than the melting point of the material making the core particle, the core particle is enabled to be confined inside the shell of the oxidized film, in other words, to be "capsulated".

Figure 6:
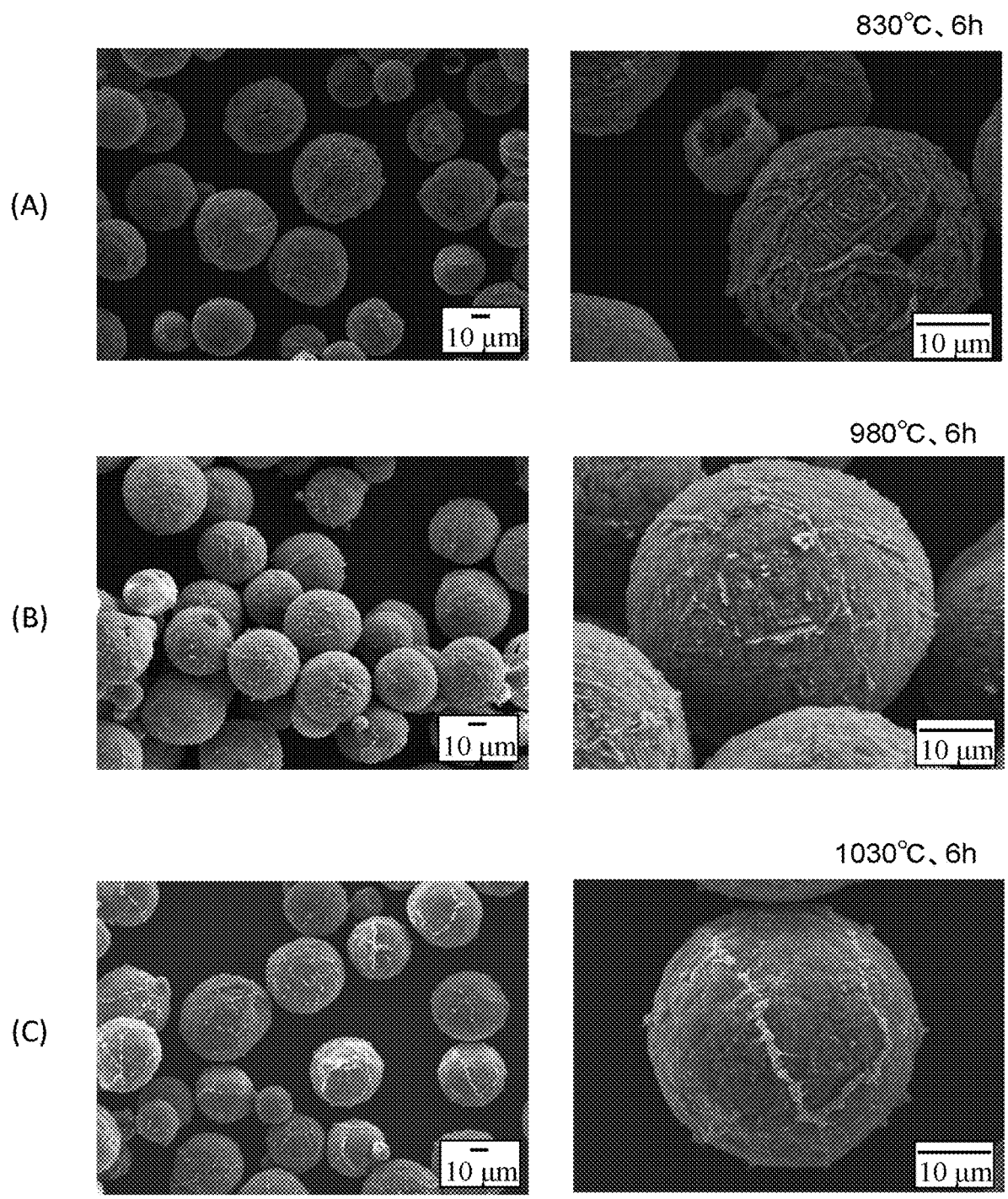
FIG. 6 is SEM images to interpret experimental results of checking the oxidation temperature dependency of the "capsulation" on the oxidation treatment temperature.
Figure 6:
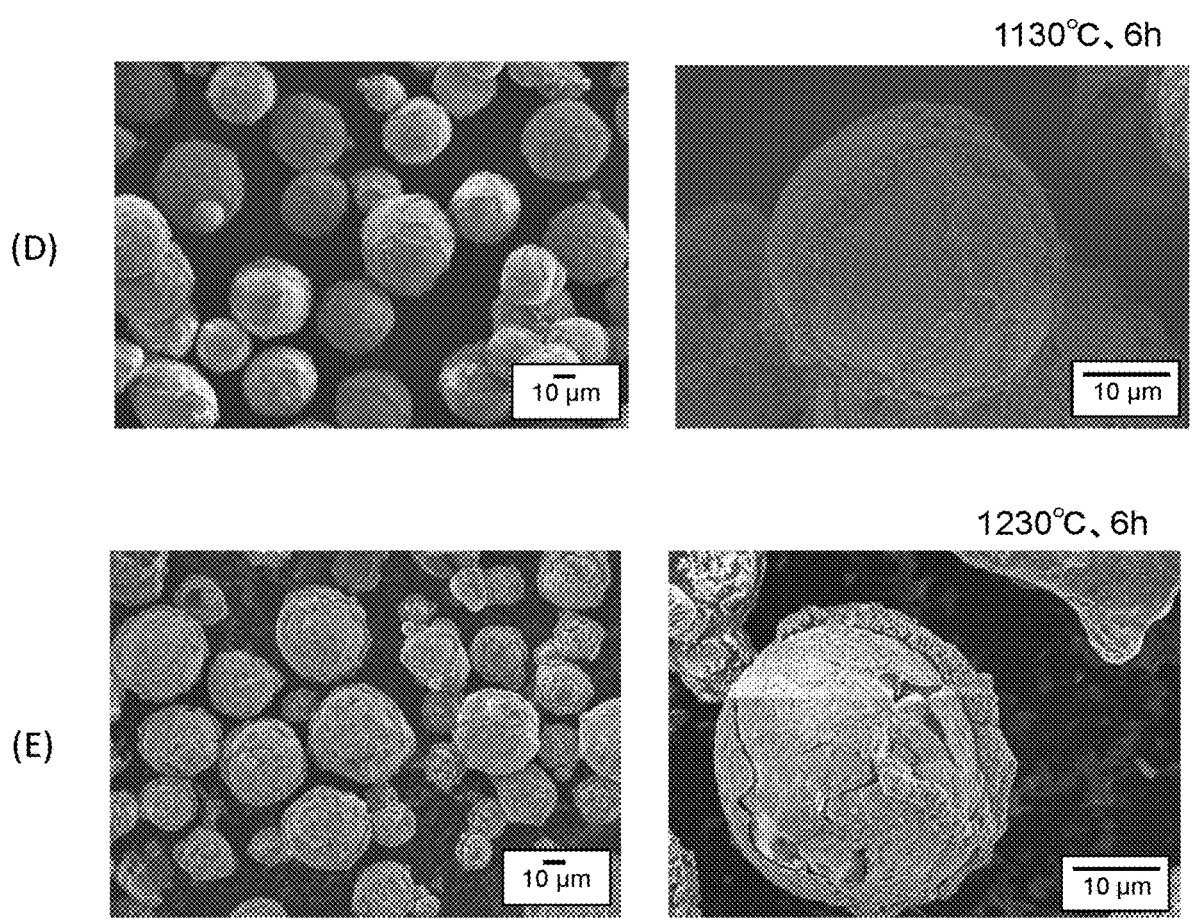

FIG. 6 is SEM images to interpret experimental results of checking the oxidation temperature dependency of the "capsulation" on the oxidation treatment temperature; specimen temperatures in the oxidation time of (A) to (E) were 830° C., 980° C., 1030° C., 1130° C. and 1230° C., respectively. Here, for any specimen, the core particle was an Al-25 wt % Si alloy; and the boehmite treatment was carried out in distilled water (at 100° C. for 3 hours), and the oxidation treatment was carried out in a pure oxygen atmosphere for 6 hours.

It is clear in the specimens of an oxidation temperature of 830° C. shown in FIG. 6(A) that the oxidized film to become a capsule was remarkably observed to cause "rupture", and no "capsulation" was made.

By contrast, neither of the specimens (B) to (E) having been subjected to the oxidation treatment at temperatures in the above range of 880 to 1230° C. was observed to cause "rupture" of the oxidized film, and the "capsulation" was made.

In the specimens of an oxidation temperature of 980° C. shown in FIG. 6(B), the "capsulation" by the oxidized film in the nearly the same surface state as the specimens of an oxidation temperature of 1030° C. shown in FIG. 5(C) has been accomplished.

Further in the specimens of an oxidation temperature of 1030° C. shown in FIG. 6(C), generation of needle crystal-like matter is found in boundary portions between the oxidized films.

Further, also in the specimens of an oxidation temperature of 1130° C. shown in FIG. 6(D), sufficient "capsulation" can be found.

In the specimens (E) of the oxidation treatment at 1230° C., however, although no "rupture" of the oxidized film is observed, signs of generation of "exfoliation" are found. Therefore, the oxidation treatment at a temperature higher than this temperature poses an apprehension that the exfoliation of the oxidized film advances and inhibits the "capsulation". Hence, the present inventors have determined that the upper limit of the heat treatment temperature is preferably 1230° C.

Figure 7:
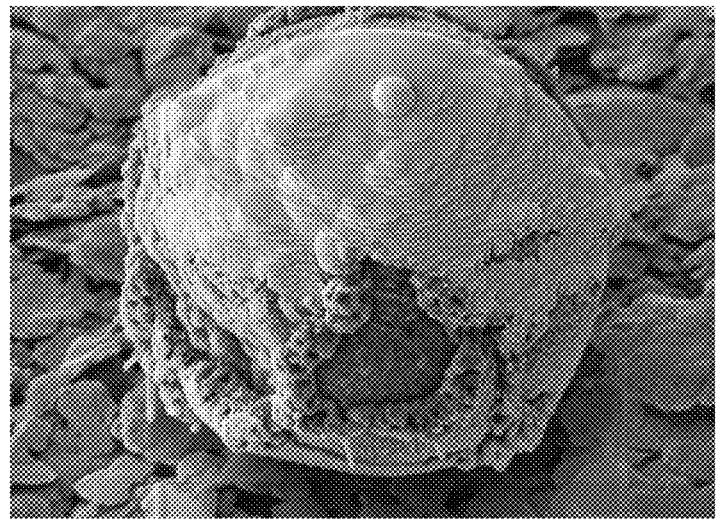
FIG. 7 is a SEM image (FIG. 7(A)) of a latent heat storage body microcapsulated by an oxidation treatment at 1130° C., and a SEM image (FIG. 7(B)) of a cross-section by an FIB processing of the latent heat storage body.
Figure 7:
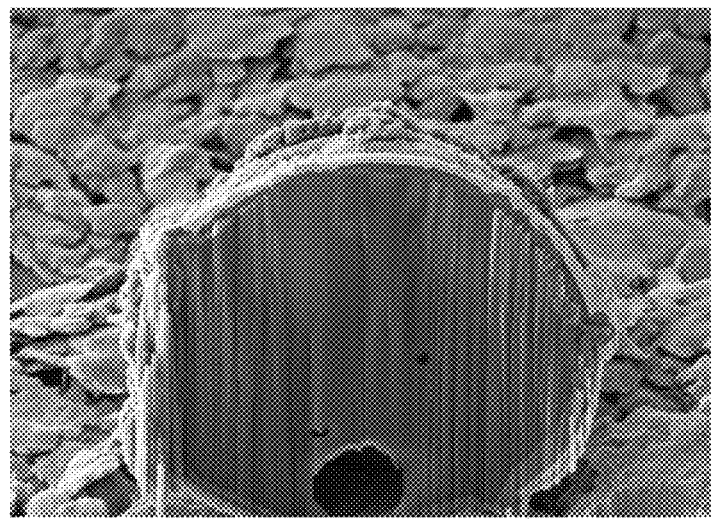

FIG. 7 is a SEM image (FIG. 7(A)) of a latent heat storage body microcapsulated by an oxidation treatment at 1130° C., and a SEM image (FIG. 7(B)) of a cross-section by an FIB processing of the latent heat storage body. In FIG. 7(B), a void as a buffer is clearly observed between a core particle and an oxidized film. Here, such voids were observed also in specimens having been subjected to the oxidation treatment at other temperatures.

Figure 8:
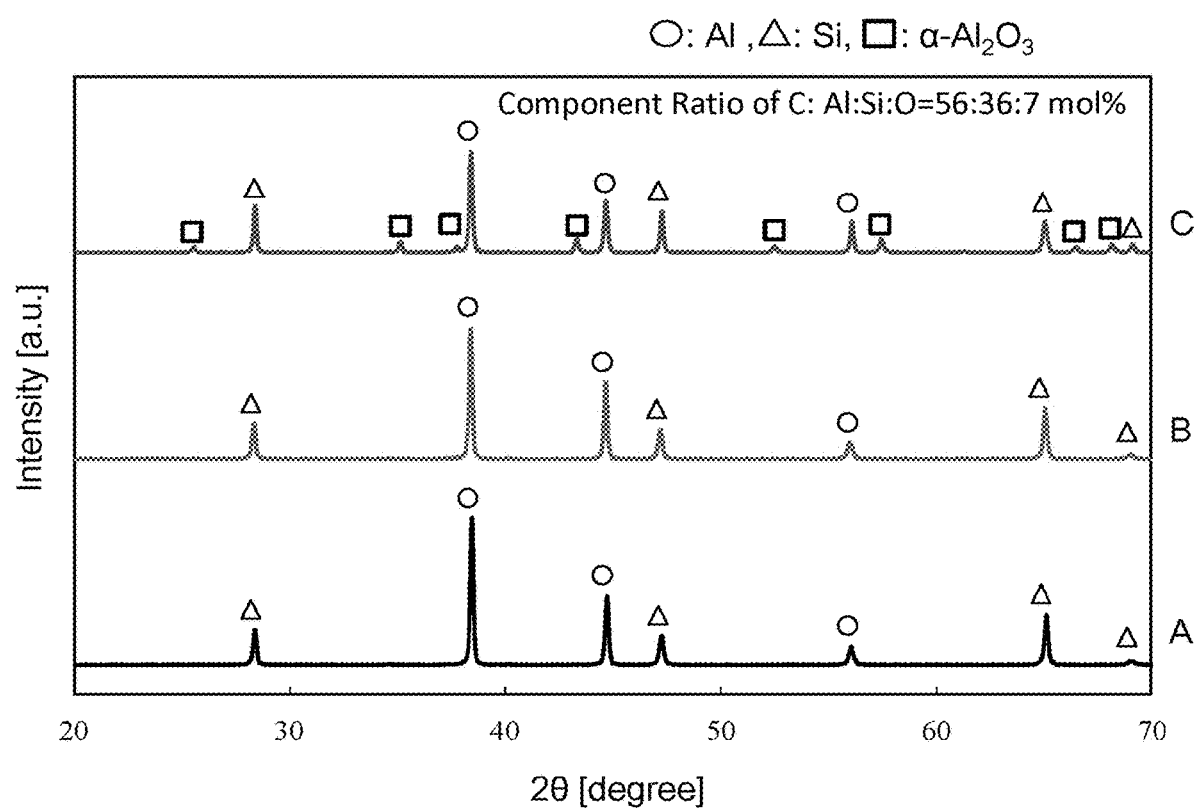
FIG. 8 is X-ray diffraction charts of a core particle (A) composed of an Al-25 wt % Si alloy, a particle (B) after a boehmite treatment, and a particle (C) after an oxidation treatment, in Examples.

FIG. 8 is X-ray diffraction charts of a core particle (A) composed of an Al-25 wt % Si alloy, a particle (B) after a boehmite treatment, and a particle (C) after an oxidation treatment at 930° C. From the core particle composed of an Al-25 wt % Si alloy, as a matter of course, diffraction lines corresponding to metal Al and diffraction lines corresponding to metal Si are found. Whereas diffraction lines corresponding to metal Al and diffraction lines corresponding to metal Si also in X-ray diffraction charts from the particle after the boehmite treatment are found, no diffraction lines corresponding to aluminum oxide are found. This is conceivably because although a primary film formed after the boehmite treatment has a composition of aluminum oxide, the aluminum oxide has a remarkably small crystallite size, or is in an amorphous state.

By contrast, in an X-ray diffraction chart from the particle after the oxidation treatment, in addition to diffraction lines corresponding to metal Al and diffraction lines corresponding to metal Si, diffraction lines corresponding to $\alpha$-$Al_2O_3$ are clearly found. In addition to this fact, from the ratio of the most intense line of Al in the vicinity of $2\theta=38°$ and the most intense line of Si in the vicinity of $2\theta=28°$, it can be recognized that the oxidation treatment moved the composition of the particle from the initial composition to a Si-rich side (Al-lean side). In this example, it is presumed that the average composition of the particle is near Al:Si:O=56:36:7 in molar ratio (% by mol). That is, the oxidation treatment consumed Al in the surface vicinity region of the core particle and the surface vicinity region became Si-rich (Al-lean) by the amount consumed.

Figure 9:
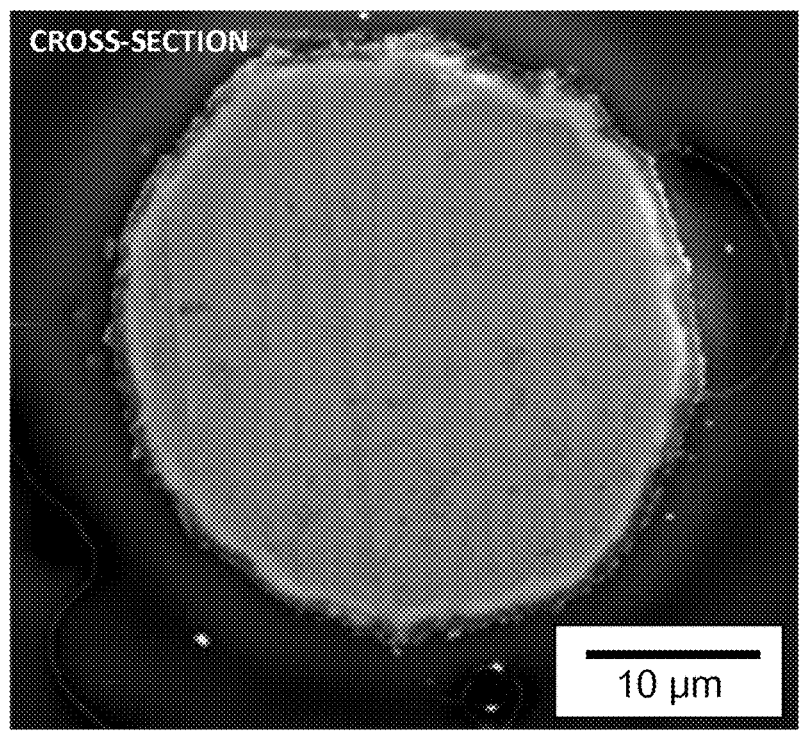
FIG. 9 is a SEM image (A) of a cross-section of a particle after an oxidation treatment, and an elemental mapping (B) of oxygen of the cross-section, in Examples.
Figure 9:
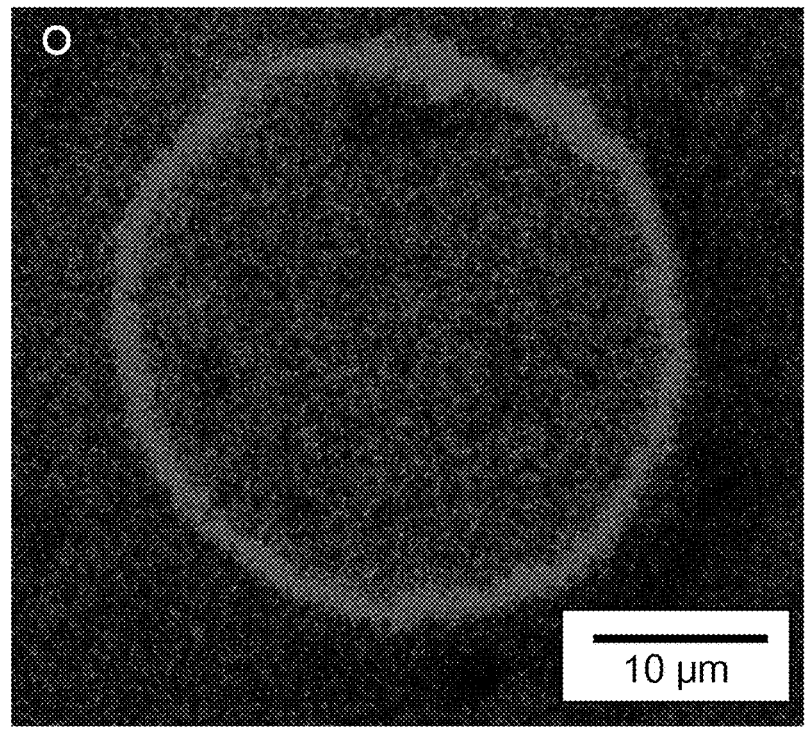

FIGS. 9(A) and 9(B) are a SEM image (A) of a cross-section of the above-mentioned particle after the oxidation treatment, and an elemental mapping (B) of oxygen of the cross-section thereof, respectively. The formation of a compact oxide phase of about 2 μm can be found after the oxidized film treatment. From an X-ray analysis chart, this phase is $\alpha$-$Al_2O_3$, revealing a success in compact capsulation with $\alpha$-$Al_2O_3$.

Figure 10:
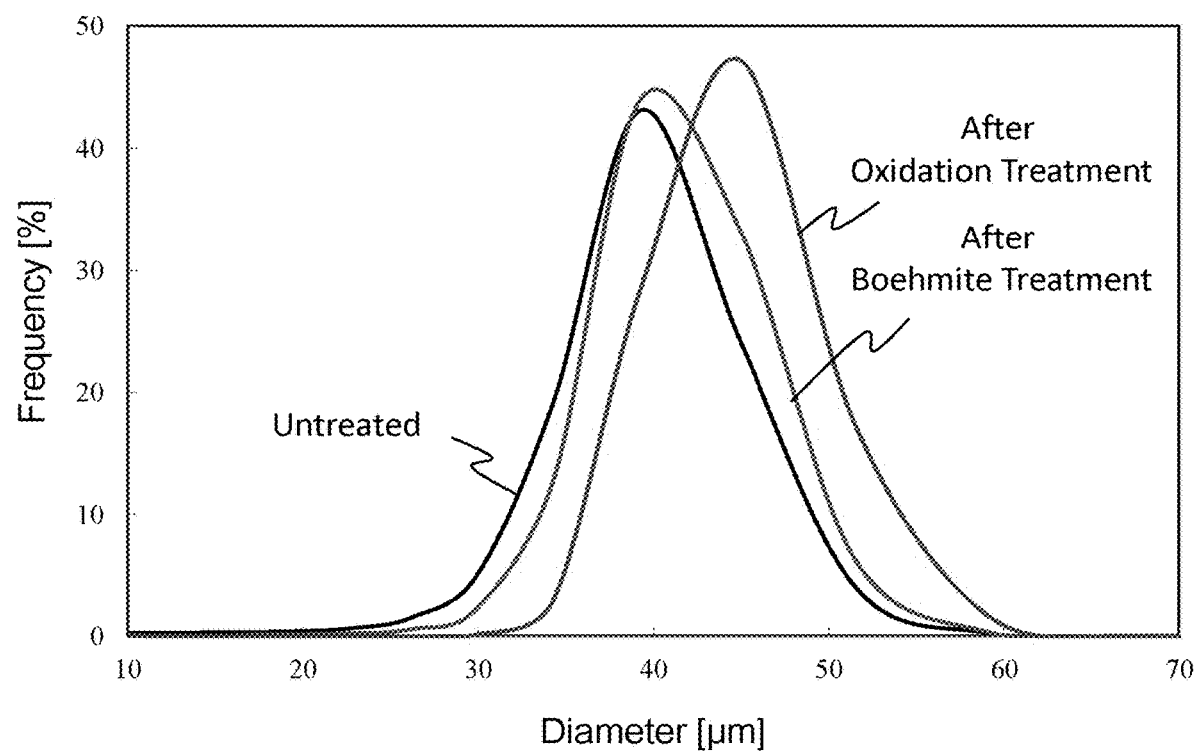
FIG. 10 is a collective diagram of measurement results of particle size distributions of an untreated core particle, a particle after boehmite treatment and a particle after an oxidation treatment.

FIG. 10 is a collective diagram of measurement results of particle size distributions of untreated core particles, particles after the boehmite treatment and particles after the oxidation treatment at 930° C. In any kind of the particles, the particle size distribution exhibits a sharp normal distribution. First, with respect to the untreated core particles, the average diameter had a value of 36.3 μm. The average particle diameter of the core particles after the boehmite treatment became 38.3 μm; from this result, it is conceivable that a primary film having a thickness of about 1 μm was formed on the core particles after the boehmite treatment.

When the particle after the boehmite treatment was subjected to the oxidation treatment, the oxidation reaction of aluminum further advanced to thereby make a secondary film of $\alpha$-$Al_2O_3$, and the average particle diameter enlarged to 40.7 μm. This result means that a secondary film of $\alpha$-$Al_2O_3$ having a thickness of about 2 μm was finally formed. By coating the surface of the core particle with the secondary film of chemically stable $\alpha$-$Al_2O_3$ in about 2 μm thick, even in the case where the core particle is in a liquid phase state, the component of the melted latent heat storage material is enabled to be detained inside the secondary film.

Figure 11:
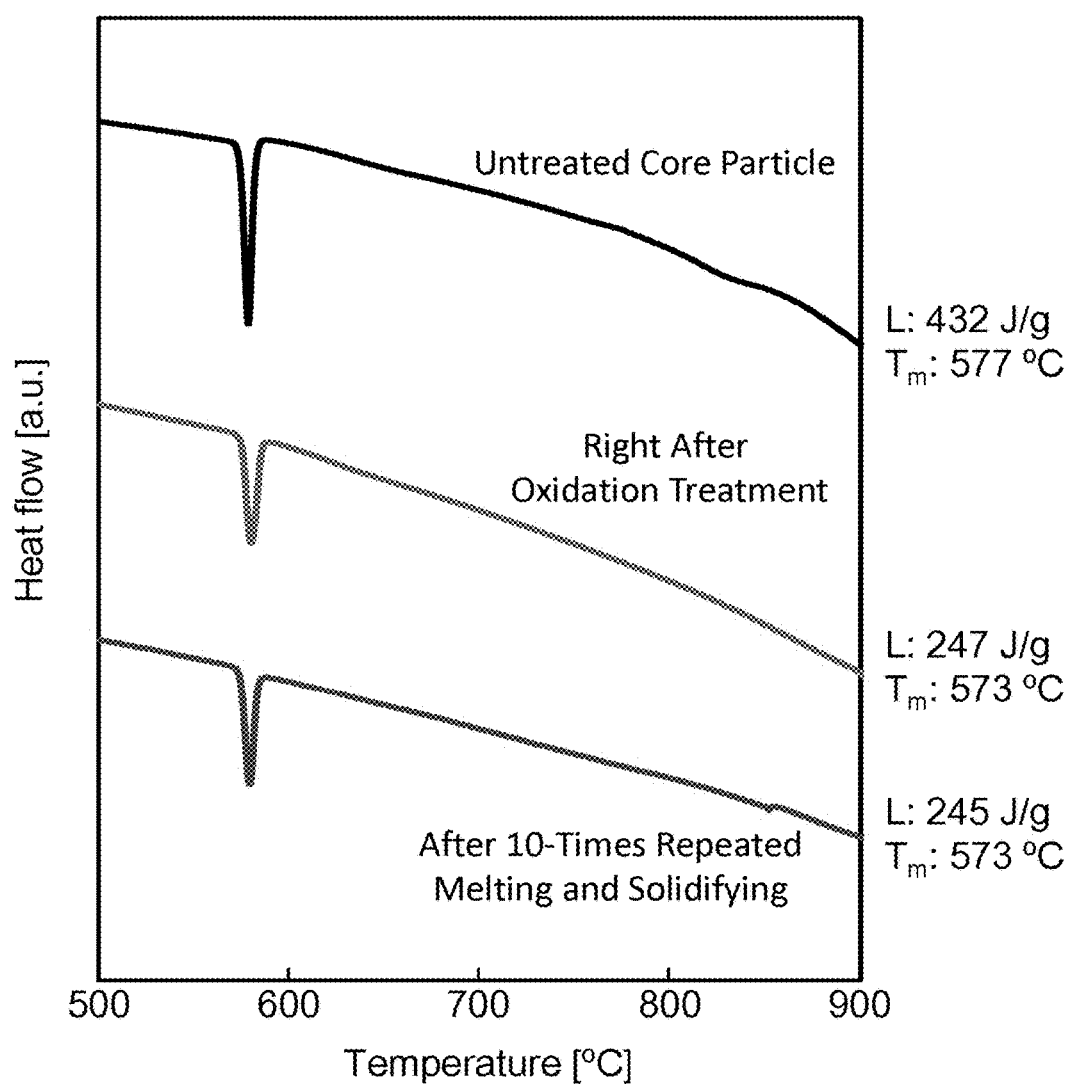
FIG. 11 is DSC curves as measured by differential scanning calorimetry of an untreated core particle, a particle right after an oxidation treatment, and a particle after 10 times-repeated melting and solidifying, in Examples.

FIG. 11 is DSC curves as measured by differential scanning calorimetry of an untreated core particle, a particle right after the oxidation treatment at 930° C., and a particle after 10 times-repeated melting and solidifying, respectively. From these results, the following values are obtained: the untreated core particle has a heat of fusion L of 432 J/g and a melting point $T_m$ of 577° C.; the particle right after the oxidation treatment has a heat of fusion L of 247 J/g and a melting point $T_m$ of 573° C.; and the particle after 10 times-repeated melting and solidifying has a heat of fusion L of 245 J/g and a melting point $T_m$ of 573° C. That is, the latent heat storage body obtained in the present Examples means holding about 60% of the quantity of latent heat of the untreated core particle. Then, it is clear that this quantity of latent heat was held even after the 10 times-repeated melting and solidifying.

Figure 12:
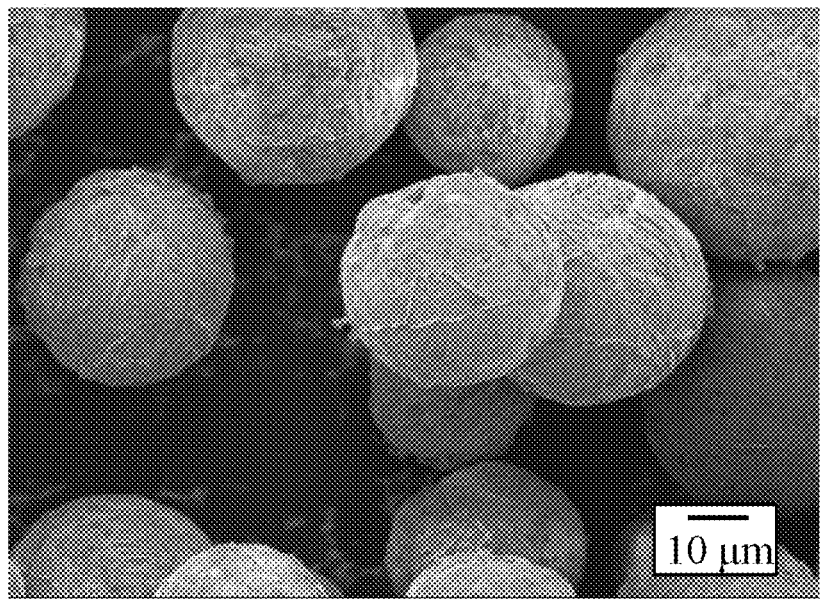
FIG. 12 is a SEM image of particles after 10 times-repeated melting and solidifying of latent heat storage bodies obtained in Examples.

FIG. 12 is SEM images of the above-mentioned particles after 10 times-repeated melting and solidifying. The shape and the like of the particles are nearly the same as those shown in the SEM image of FIG. 5(C); and it is clear that even after the 10 times-repeated melting and solidifying, the shape and the like after the producing were maintained.

Although experimental examples in the case of using a core particle composed of an Al-25 wt % Si alloy have hitherto been described, the present inventors have carried out experiments also in the case of using core particles composed of Al-12 to 25 wt % Si alloys, and obtained similar results.

Figure 13:
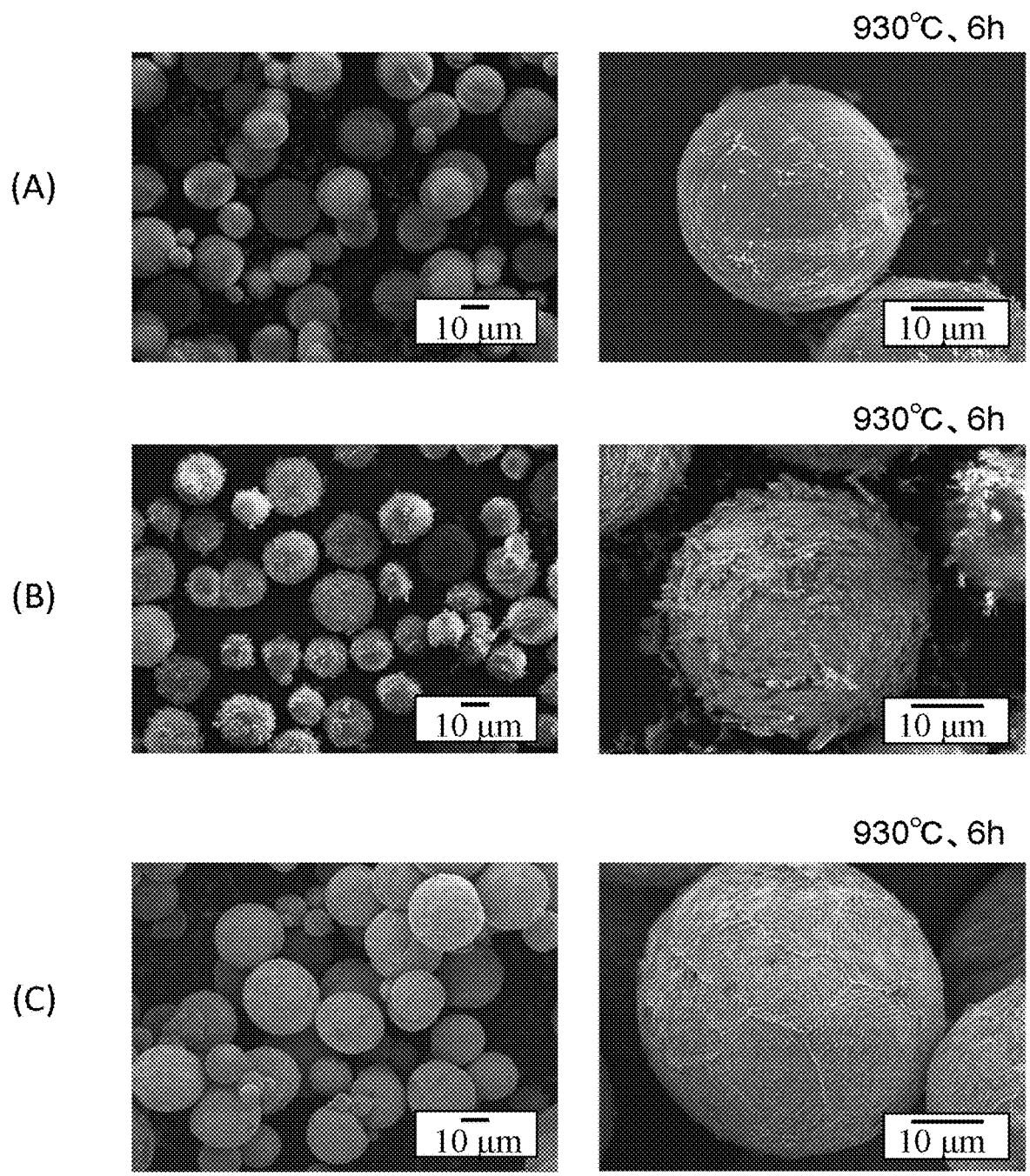

FIG. 13 is examples of latent heat storage bodies having been subjected to the above-mentioned capsulation (at a specimen temperature of 930° C. for 6 hours) using core particles composed of Al—Si alloys having different Si contents, in which FIG. 13(A) is SEM images of latent heat storage bodies obtained by capsulating core particles composed of an Al-12 wt % Si alloy; FIG. 13(B), by capsulating core particles composed of an Al-17 wt % Si alloy; and FIG. 13(C), by capsulating core particles composed of an Al-25 wt % Si alloy.

Although the surface shapes of the capsulated latent heat storage bodies were different depending on the Si contents of Al—Si alloys, capsulation was achieved for any of the latent heat storage bodies. The present inventors considered that in principle, even if the Si content is 0% by weight (that is, Al metal is made into a core particle), the capsulation is possible.

Here, in the above, experimental examples in the case of using the core particles composed of an Al-25 wt % Si alloy having an average diameter of about 36 μm have been described, but if the core particle has a particle diameter larger than about 10 μm, the "capsulation" is possible.

Figure 14:
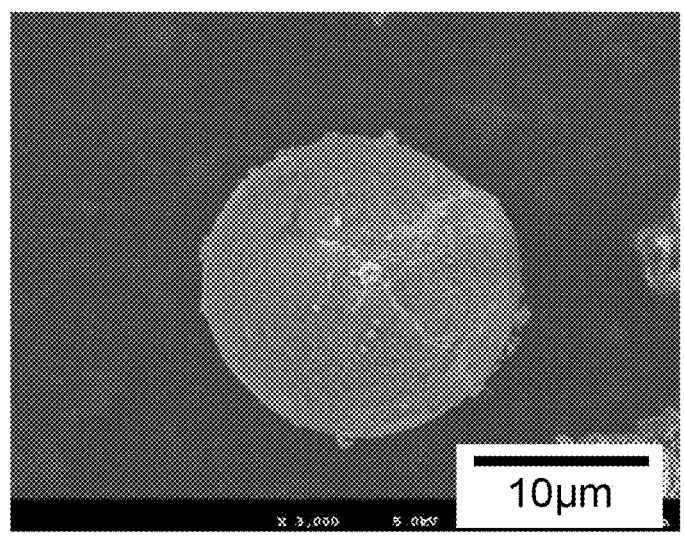
FIG. 14 is examples of a SEM image (FIG. 14(A)) of a latent heat storage body obtained by using a core particle composed of an Al-25 wt % Si alloy having an average particle diameter of about 20 μm, and a SEM image (FIG. 14(B)) of a cross-section by a FIB processing of a latent heat storage body obtained by using a core particle composed of an Al-25 wt % Si alloy having an average particle diameter of about 10 μm.
Figure 14:
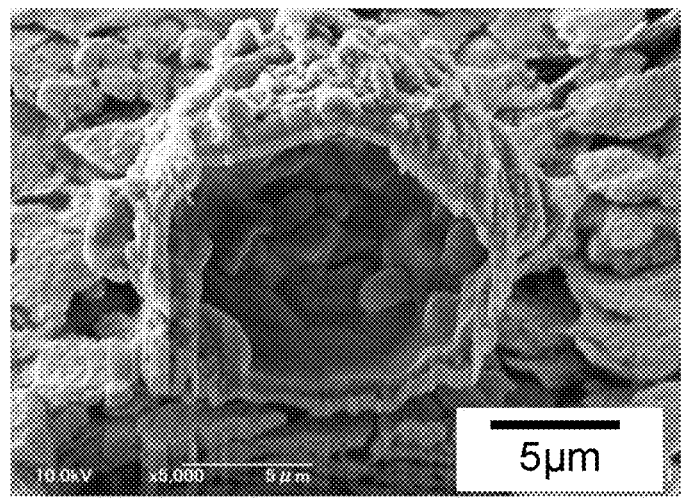

FIG. 14 is examples of a SEM image (FIG. 14(A)) of a latent heat storage body obtained by using a core particle composed of an Al-25 wt % Si alloy having an average particle diameter of about 20 μm, and a SEM image (FIG. 14(B)) in observation of a cross-section by a FIB processing of a latent heat storage body obtained by using a core particle composed of an Al-25 wt % Si alloy having an average particle diameter of about 10 μm. Here, the specimen temperature in the capsulation time is 1130° C., and the treatment time is 6 hours.

From the SEM image shown in FIG. 14(A), it is clear that also in the case of using a core particle composed of an Al—Si alloy having an average diameter of about 20 μm, the capsulation has been achieved as a particle near a relatively true sphere. Further from the SEM image shown in FIG. 14(B), it is clear that in the case of using a core particle composed of an Al—Si alloy having an average diameter of about 10 μm, although the sphericity became low, the capsulation itself was achieved.

The latent heat storage body according to the present invention has a remarkably high durability in heat storage and release cycles.

Figure 15:
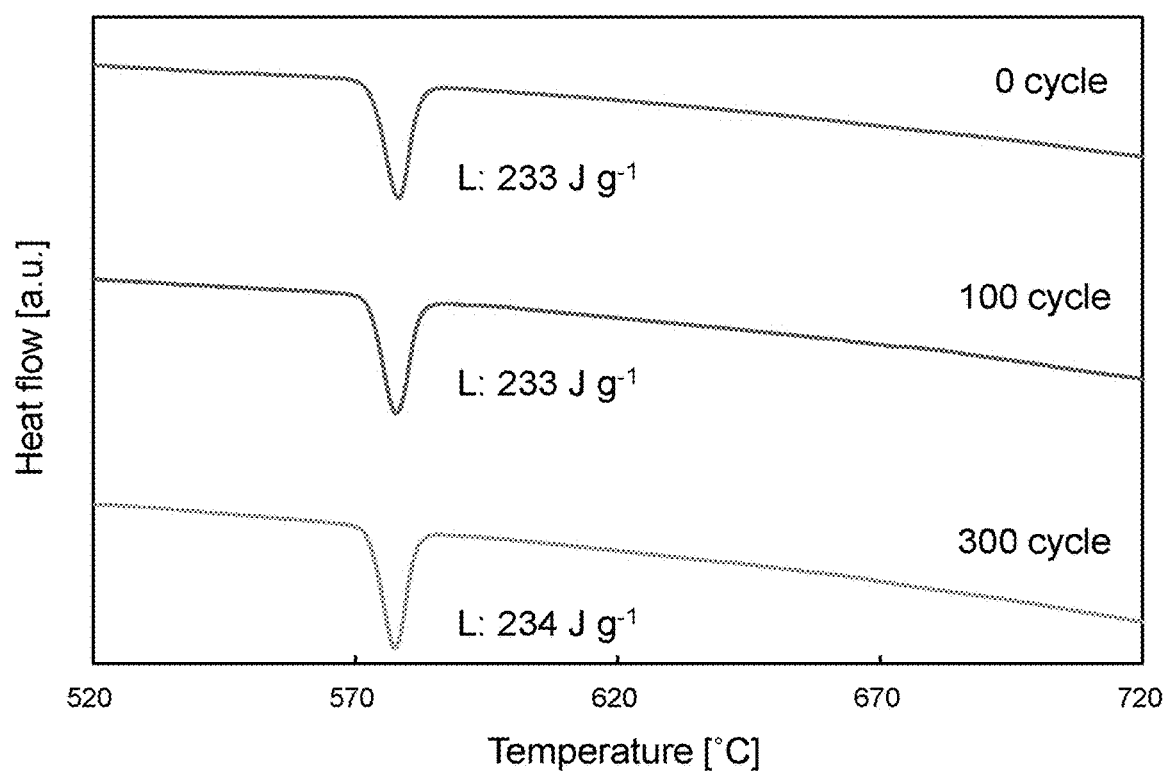
FIG. 15 is respective DSC curves as acquired by differential scanning calorimetry of a particle right after an oxidation treatment at 1150° C., a particle after 100 times-repeated melting and solidifying in an oxygen atmosphere, and a particle after 300 times-repeated melting and solidifying in an oxygen atmosphere.

FIG. 15 is DSC curves as acquired by differential scanning calorimetry of a particle right after an oxidation treatment at 1150° C., a particle after 100 times-repeated melting and solidifying in an oxygen atmosphere, and a particle after 300 times-repeated melting and solidifying in an oxygen atmosphere. Here, this result is by latent heat storage bodies obtained by using core particles composed of an Al-25 wt % Si alloy; and the melting and solidifying cycle was repeated under the condition of the solidifying at 500° C. and the melting at 650° C. and 50 K/min. From these results, it is clear that the latent heat storage body held its heat storage property even after 300-times repeated melting and solidifying. Further as a result of SEM observation, the latent heat storage body maintained its initial shape even after 300-times repeated melting and solidifying. Here, in the above experiment, the melting and solidifying was repeated in an oxygen atmosphere, but also in a similar experiment carried out in an Ar atmosphere, nearly the same result was obtained. The present inventors considered that setting the temperature in the oxidation treatment time at the high side enhances the oxidized film strength, resultantly also raising the melting and solidifying cycle property.

As described above, the strengthening of the mechanical strength of the capsule is possible by providing such a latent heat storage material with a step of subjecting the latent heat storage material to chemical means such as a sol gel process, CVD, electroplating and electroless plating, and a physical treatment such as PVD, and carrying out overcoating with a metal film or an oxide film.

Figure 16:
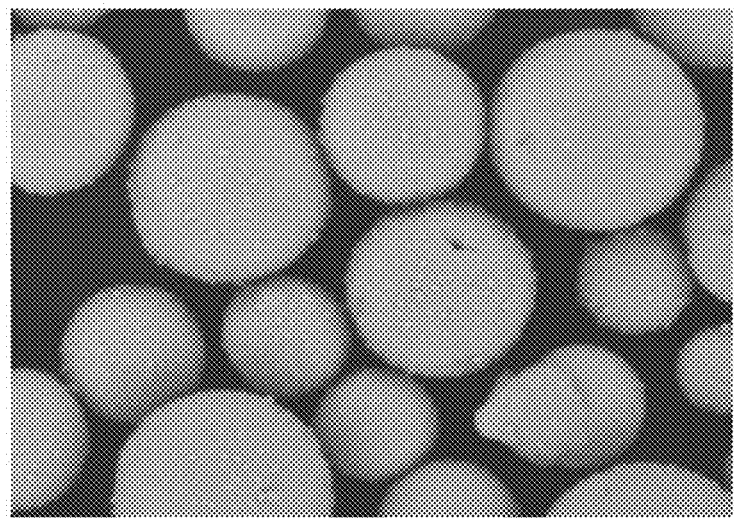
FIG. 16 is SEM images of latent heat storage bodies in which an oxidized film of $Al_2O_3$ was formed on the surface of a core particle composed of an Al—Si alloy and the oxidized film formed was further coated with a Ni film.
Figure 16:
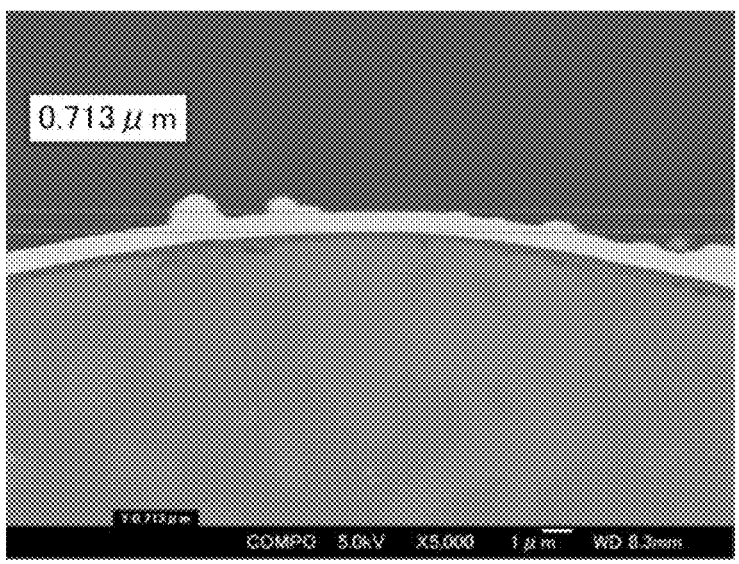

FIG. 16 is SEM images of latent heat storage bodies in which an oxidized film of $Al_2O_3$ is formed on the surface of a core particle composed of an Al—Si alloy and the oxidized film formed is further coated with a Ni film in a thickness of about 0.7 μm.

As described hitherto, in the latent heat storage body according to the present invention, the surface of a core particle composed of a latent heat storage material is coated with an oxidized film of a compositional element of the core particle. Then, the core particle is composed of the latent heat storage material of a metal or an alloy having a relationship of $V_S \leq V_L$ in the volume $V_S$ in a solid phase time and the volume $V_L$ in a liquid phase time. Hence, the step of separately fabricating a core particle and an oxidized film corresponding to a shell accommodating the core particle and accommodating the core particle inside the shell becomes unnecessary, and in addition since the core particle exhibits no expansion when transforming from a solid phase to a liquid phase, the component of the melted latent heat storage material stays inside the space covered with the oxidized film and the oxidized film is never damaged. Further, since the oxidized film can be made chemically stable, it becomes possible to provide the latent heat storage body stable also in the course of heat storage cycles, utilizable even at relatively high temperatures and excellent in the heat storage density and the heat conduction.

INDUSTRIAL APPLICABILITY

The present invention provides a latent heat storage body stable also in the course of heat storage cycles, utilizable even at relatively high temperatures and excellent in the heat storage density and the heat conduction.

REFERENCE SIGNS LIST

10 CORE PARTICLE
20 OXIDIZED FILM
30 BEAKER
40 HOT PLATE
50 STIRRING ROD
60 CRUCIBLE
70A INSERT BAR
70B THERMOCOUPLE
80A HEATER
80B HEATER
90A GAS INTRODUCTION PORT
90B GAS EXHAUST PORT
100 LATENT HEAT STORAGE BODY
200 HEAT TREATMENT OVEN

The invention claimed is:

1. A latent heat storage body microcapsule, comprising:
    a core particle comprising a latent heat storage material of an alloy; and
    a double film, with which a surface of the core particle is coated, and comprising a compact first oxidized film of a compositional element of the core particle, and a second oxidized film, provided on an outer surface of the compact first oxidized film, of a compositional element of the core particle,
    wherein the alloy of the core particle is an A-B alloy of at least one alloy component A selected from the following group A with at least one alloy component B selected from the following group B; and a standard free energy ($\Delta G_A^0$) of oxide formation of the alloy component A and a standard free energy)($\Delta G_B^0$) of oxide formation of the alloy component B satisfy a relationship of $\Delta G_A^0 \geq \Delta G_B^0$:
    group A: Ca, Si, Bi, Mg, Sb, In, Sn, Al, Ti, Cr, Mn, Fe, Co, Ni, Cu, Zn, Pd, Ag, Au or Pb; and
    group B: Al, Cr, Mn, Si, Mg, Co or Ni; and
    wherein both of the first oxidized film and the second oxidized film are $\alpha$-$Al_2O_3$.

2. The latent heat storage body microcapsule according to claim 1, wherein the alloy of the core particle is an Al—Si alloy wherein the Al—Si alloy is controllable to have a low volume expansion coefficient at melting by adjusting a content ratio of Si, which has a negative volume expansion coefficient at melting.

3. The latent heat storage body microcapsule according to claim 1, further comprising a metal film on the surface.

4. The latent heat storage body microcapsule according to claim 1, wherein when the latent heat storage material is in a solid phase state, a void as a buffer is present between the core particle and the oxidized film.

5. A heat exchange material, comprising:
    a heat-resistive base material; and
    a latent heat storage body microcapsule according to claim 1 dispersed and carried in the heat-resistive base material.

* * * * *